United States Patent [19]
Anichini et al.

[11] Patent Number: 5,493,770
[45] Date of Patent: Feb. 27, 1996

[54] DYNAMO-ELECTRIC MACHINE ARMATURE WINDING METHODS AND APPARATUS

[75] Inventors: Luciano Anichini; Massimo Lombardi, both of Florence, Italy

[73] Assignee: Axis USA, Inc., Tampa, Fla.

[21] Appl. No.: 218,214

[22] Filed: Mar. 25, 1994

[51] Int. Cl.⁶ .................................................. H02K 15/08
[52] U.S. Cl. .................. 29/597; 29/598; 29/733; 29/736; 242/7.05 B
[58] Field of Search ................. 29/597, 598, 605, 29/733, 735, 736; 242/7.05 B, 7.05 R, 7.03

[56] References Cited

U.S. PATENT DOCUMENTS

| | | | |
|---|---|---|---|
| 3,361,371 | 1/1968 | Dickensheets et al. | 242/13 |
| 3,713,598 | 1/1973 | Bucholtz et al. | 242/7.05 B |
| 3,785,034 | 1/1974 | Bucholtz | 29/735 X |
| 3,818,570 | 6/1974 | DelBono . | |
| 4,027,827 | 6/1977 | Biddison | 242/7.05 B |
| 4,459,742 | 7/1984 | Banner | 29/597 |
| 4,775,607 | 7/1988 | Dolgas | 29/735 X |
| 4,826,092 | 5/1989 | Tsugawa | 242/7.05 B |
| 4,974,313 | 12/1990 | Reiger, Jr. | 29/736 |
| 5,257,745 | 11/1993 | Lombardi et al. | 242/7.05 B |

FOREIGN PATENT DOCUMENTS

63-257440 10/1988 Japan .

*Primary Examiner*—S. Thomas Hughes
*Attorney, Agent, or Firm*—Fish & Neave; Robert R. Jackson

[57] ABSTRACT

Dynamo-electric machine armatures which have commutators and cores that are axially close to one another are wound with the aid of wire guiding hooking plates that are inclined to reach into the portion of the commutator that is axially adjacent to the core where the coil leads must be attached to the commutator. The hooking plate may also perform an additional extension motion in order to press the coil leads out of the way of a subsequent fusing operation. This function may alternatively be performed by a separate pusher member which is either associated with the hooking plate or independent of the hooking plate. The fusing electrode may be specially shaped to facilitate performing fusing operations axially close to the armature core.

24 Claims, 13 Drawing Sheets

DYNAMO-ELECTRIC MACHINE ARMATURE WINDING METHODS AND APPARATUS

BACKGROUND OF THE INVENTION

This invention relates to methods and apparatus for winding armatures for dynamo-electric machines such as electric motors. The invention is especially advantageous in winding armatures in which the commutator is axially relatively close to the armature core or "stack".

Certain kinds of dynamo-electric machine armatures are required to have the commutator axially close to the armature core. For example, automobile ventilator motors frequently have this type of armature. Because it is difficult or impossible to attach the leads of the armature coils to a commutator which is close to the armature core on which the coils are being wound, it is customary to wind the armature with the commutator at a greater axial spacing from the core. Then, after all the coils have been wound and their leads attached to the commutator, the commutator is shifted to its final position closer to the core. Although workable, this approach has several disadvantages. For example, it is difficult to ensure that the commutator is stable and secure both before and after it is axially shifted. The commutator must not be allowed to rotate during the axial shifting. It may be necessary to provide the armature with a shaft that is longer than is needed in the ultimate use of the armature so that the shaft is long enough to support the commutator in its temporary position during winding of the coils. Shifting the commutator closer to the core after the coil leads have been attached to the commutator produces slack in the coil leads which can be a problem when the armature is rotated at high speed in its ultimate use. Such shifting of the commutator may also weaken the fused connections that have been made between the coil leads and the commutator.

For all of the foregoing reasons it would be desirable to provide methods and apparatus for winding armatures with closely spaced cores and commutators that do not require the commutator to be shifted axially after the coils have been wound, and it is accordingly an object of this invention to provide such methods and apparatus.

It is another object of this invention to provide improved methods and apparatus for winding armatures having closely spaced cores and commutators.

SUMMARY OF THE INVENTION

These and other objects of the invention are accomplished in accordance with the principles of the invention by providing armature coil winding methods and apparatus that employ a wire guiding member (sometimes known as a hooking plate) that is inclined relative to both the armature shaft and a plane perpendicular to the armature shaft so that the operative end of the hooking plate can be extended into the region adjacent the end of the commutator that is axially closer to the armature core. This allows the operative end of the hooking plate to guide wire into the commutator structure (typically a hook or "tang") that is designed to receive a coil lead, even though that structure is relatively inaccessible from a direction that is radial of the armature shaft. For example, the axial ends of the coils wound on the core may make the commutator tangs difficult or impossible to access along directions that are radial of the armature shaft. Inclining the hooking plate as described above also makes it possible for the hooking plate to pass through an aperture in the coil winding form at a location where such an aperture can be provided without producing a discontinuity in the surface of the coil winding form that would be unacceptable from the standpoint of smooth guidance of the wire into the coils.

In addition to guiding the coil leads into the commutator tangs or other lead anchoring structures, the hooking plate or an associated or independent pusher member may be used to push the coil lead wires radially inwardly between the commutator and the core so that the coil lead wires are fully seated in the coil lead anchoring structures, and also so that the coil lead wires do not constitute an obstacle to the member that is subsequently used to fuse the coil leads to the commutator.

If desired, special coil lead fusing methods and apparatus may also be used in accordance with this invention. A fusing electrode may be shaped to facilitate fusing the coil leads to the commutator using radial motion of the fusing electrode relative to the commutator, even though a radius extending out from the fusing site on the commutator intercepts or nearly intercepts the axial ends of the coils. The commutator is moved relative to the fusing electrode to position the fusing electrode for the radial motions relative to the commutator that are used for fusing the coil leads to the commutator.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
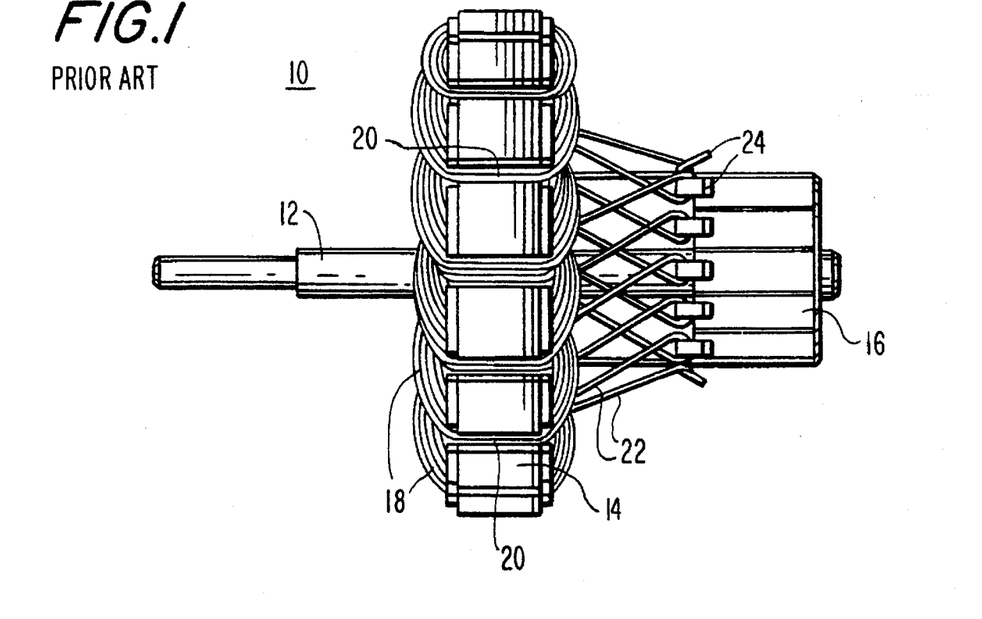
FIG. 1 is a simplified elevational view of an illustrative armature being wound in accordance with a prior art winding method.

FIG. 1 shows an illustrative armature 10 that has been wound in the conventional way prior to axial shifting of the commutator 16 toward the core 14. As shown in FIG. 1, armature 10 has a plurality of coils of wire 18, each of which is wound in a respective pair of radially and axially extending slots 20 in core 14. In addition to the portions of coils 18 that are disposed in slots 20, coils 18 have axial end portions that lie along the axial end faces of core 14. Each coil begins and ends with leads 22 that extend to tangs 24 on commutator 16. In particular, the wire 22 that ends a typical coil 18 is looped around a tang 24 and then returns to core 14 as the start lead for the next coil to be wound. The wire typically forms a shape like the Greek letter alpha as it passes around the commutator tang, although the wire may have another shape adjacent the tang if desired.

After all the coils 18 have been wound as described above, tangs 24 are fused to coil leads 22. This typically involves applying radial pressure and heat to each tang so that the tang is deformed radially inwardly into intimate mechanical and electrical contact with the coil lead 22 and the remainder of the commutator under the tang. The heat vaporizes the insulation on the coil lead and helps to ensure that desired mechanical and electrical bonds are formed.

Figure 2:
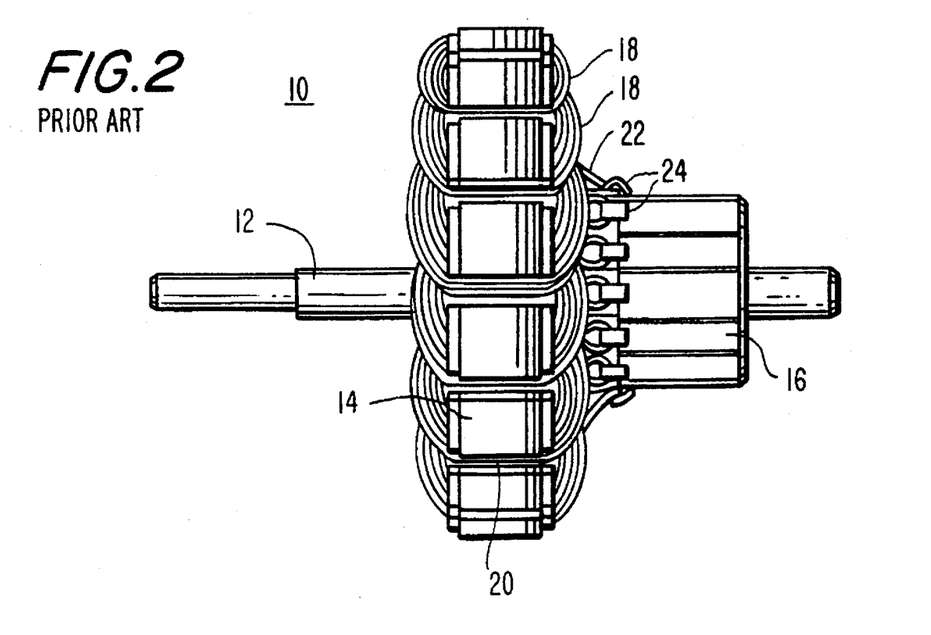
FIG. 2 is a view of the armature of FIG. 1 at a later stage in the processing of that armature.

After the fusing operation, commutator 16 is pushed axially toward core 14 to its final position as shown in FIG. 2.

As mentioned in the background section of this specification, the foregoing prior art procedure has a number of disadvantages. For example, it may be difficult to ensure that commutator 16 is axially and rotationally stable on shaft 12 both before and after it is axially shifted from the position shown in FIG. 1 to the position shown in FIG. 2. It may also be difficult to ensure that commutator 16 does not rotate relative to core 14 as it is being axially shifted. Axial shifting of commutator 16 produces slack in leads 22, which may be a problem when the finished armature is put to use involving high speed rotation about shaft 12. This disturbance of leads 22 may also weaken the fused connections between leads 22 and tangs 24. Shaft 12 may also have to be longer than is ultimately necessary in order to provide support for commutator 16 in its temporary starting position shown in FIG. 1.

On the other hand, the final armature configuration shown in FIG. 2 reveals the difficulty of attempting to wind the armature with commutator 16 in its final position close to core 14. It is difficult or impossible with conventional apparatus to loop coil leads 22 around tangs 24 that are so close to core 14. It is similarly difficult or impossible to apply the radial pressure to tangs 24 required to fuse tangs 24 to leads 22. The axial end portions of coils 18 tend to be in the way of apparatus that must move radially in toward tangs 24 when commutator 16 is in its final axial position as shown in FIG. 2.

Figure 3:
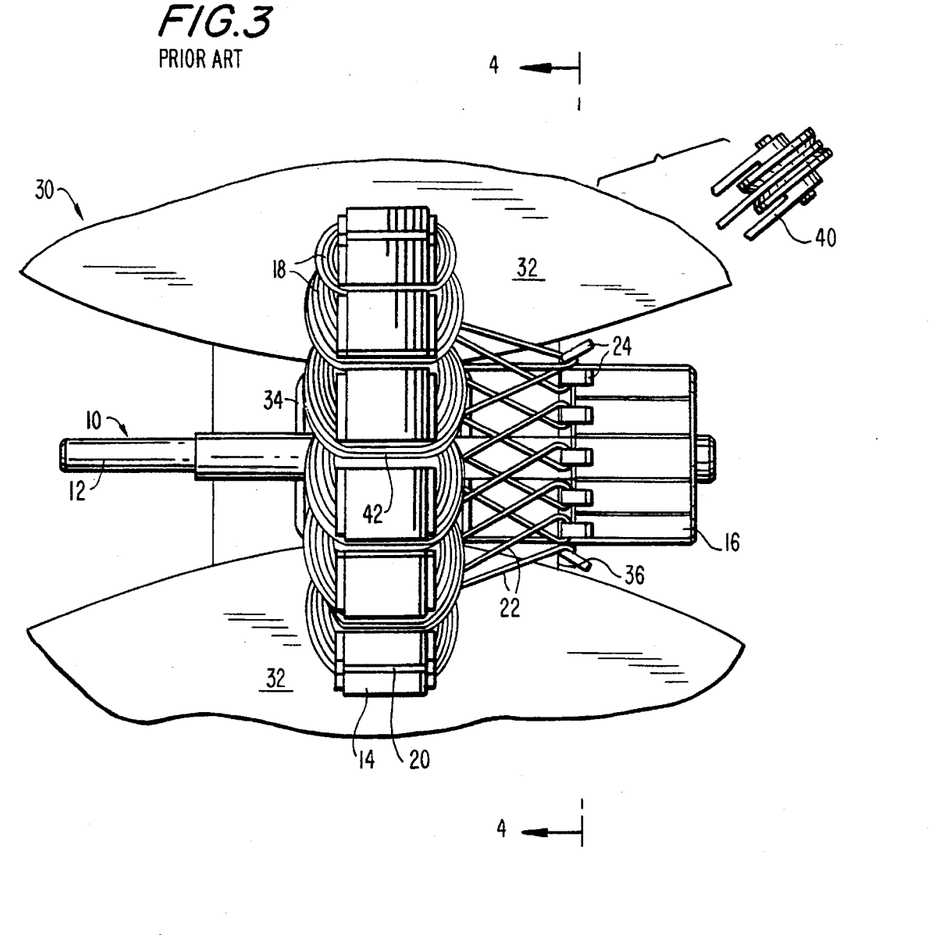
FIG. 3 is a view similar to FIG. 1 additionally showing portions of apparatus typically used for winding such armatures.
Figure 4:
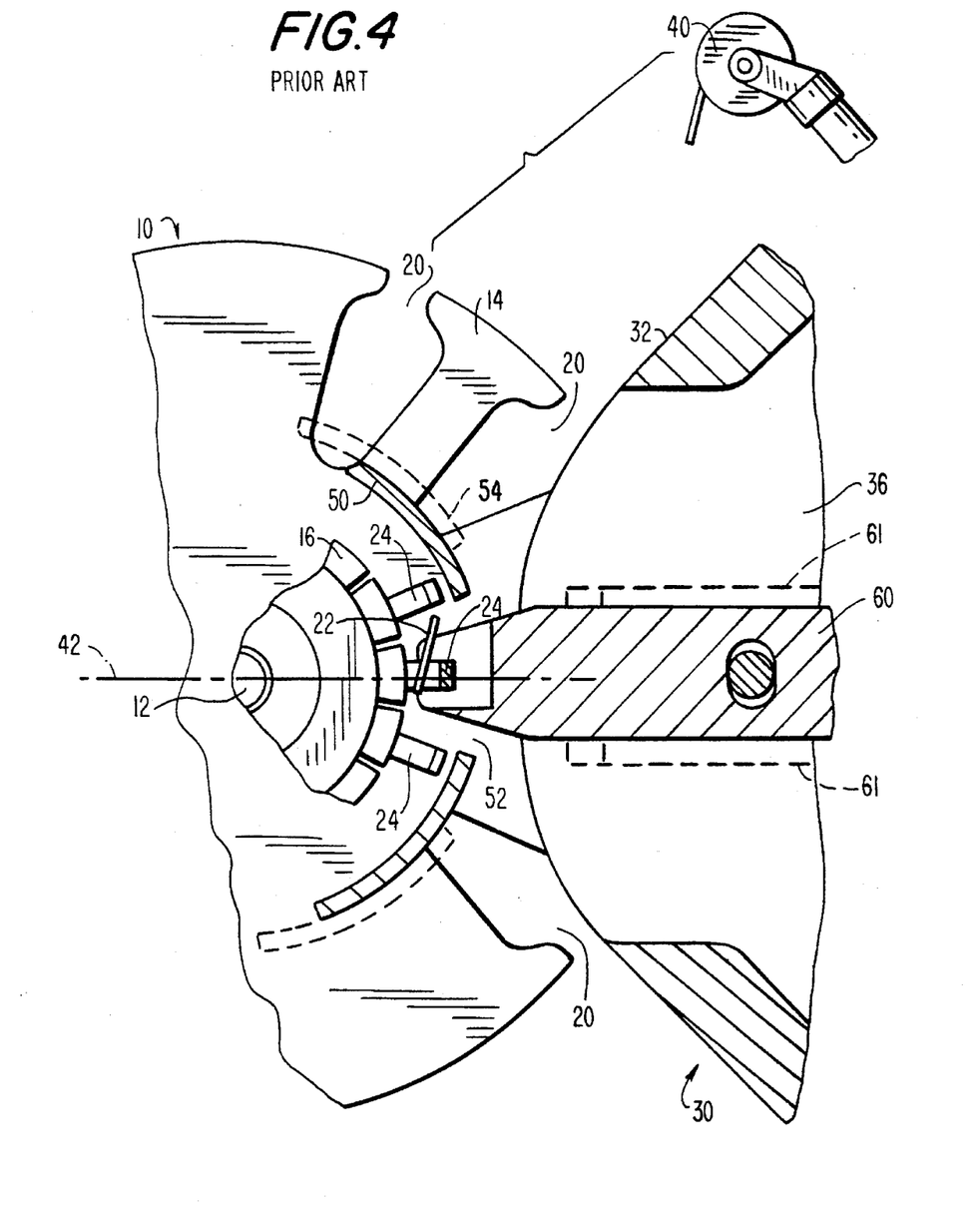
FIG. 4 is a simplified view taken generally along the line 4—4 in FIG. 3.

FIGS. 3 and 4 show portions of illustrative prior art apparatus for winding armatures as shown in FIG. 1. (Additional information regarding this type of apparatus may be found in such references as Bucholtz et al. U.S. Pat. No. 3,713,598, Reiger U.S. Pat. No. 4,974,313, and Lombardi et al. U.S. Pat. No. 5,257,745.) On each side of armature 10 is a wire guide 30 and an associated wire-dispensing flyer 40 (only the wire guide and flyer on one side of armature 10 being shown in FIGS. 3 and 4). Flyers 40 rotate about axis 42, which is substantially perpendicular to shaft 12 and which is axially centered on core 14. Each wire guide 30 has a generally convex outer surface 32 for guiding wire from the associated flyer 40 into a pair of slots 20 in armature core 14 as the flyer rotates about axis 42 to wind coils 18. A portion of the side of core 14 adjacent to the wire guide is received in a concave recess 34 in the wire guide. Recess 34 is sized to help size and shape the axial end portions of coils 18 as the coils are wound.

As shown in FIG. 4, two concentric shields or sleeves 50 and 54 partly or wholly cover commutator 16 at various times during the coil winding operation. Inner sleeve 50 has a slot 52 through which one (and only one) tang 24 can be accessed when outer sleeve 54 is withdrawn axially from the vicinity of tangs 24. On the other hand, when outer sleeve 54 is not thus withdrawn, outer sleeve 54 covers slot 52 and prevents the wire being dispensed by flyer 40 from catching on the tang adjacent to slot 52.

When the winding of a coil 18 has been completed and it is desired to connect the ending lead of that coil to a commutator tang 24, the rotation of flyer 40 is stopped and armature 10 is rotated about shaft 12 until the desired tang 24 is adjacent slot 52 in inner sleeve 50. Outer sleeve 54 is then withdrawn and hooking plate 60 is extended into the vicinity of the selected tang 24 as shown in FIG. 4. Flyer 40 is then rotationally moved again to cause wire from the flyer to travel along a surface of hooking plate 60 and be deposited beneath exposed tang 24. Flyer 40 is then stopped again, hooking plate 60 is withdrawn, and outer sleeve 54 is re-extended to cover slot 52. Armature 10 is then rotated about shaft 12 to position the next pair of slots 20 that is to receive a coil adjacent to the convex surface 32 of wire guide 30. Rotation of flyer 40 then resumes to wind the next coil.

It will be observed that hooking plate 60 is mounted on an external surface 36 of wire guide 30 which is radially adjacent tangs 24 while commutator 16 is in its initial position (i.e., axially spaced from core 14). (Dotted lines 61 in FIG. 4 indicate that hooking plate 60 has a T-shaped cross section perpendicular to its axis of reciprocation, the top of the T being received in a complementary T-shaped keyway in wire guide 30. This structure guides and supports hooking plate 60 for reciprocation along the side surface 36 of wire guide 30.) Surface 36 is a portion of wire guide 30 that is sufficiently far from core 14 that the wire from flyer 40 does not need to ride along that surface on its way from flyer 40 to core 14. It will also be noted that hooking plate 60 is aligned with and reciprocates along an axis that is radial of armature 10. Hooking plate 60 can have these positional and operational characteristics because commutator 16 is initially spaced relatively far from core 14. Indeed, the need of typical prior art apparatus to have hooking plate components positioned and operated as described above in connection with FIGS. 3 and 4 is one of the considerations that prompted development of the prior art technique of winding armatures with commutators initially axially spaced from the core, with the commutator being shifted closer to the core only after winding of the armature is complete.

Figure 5:
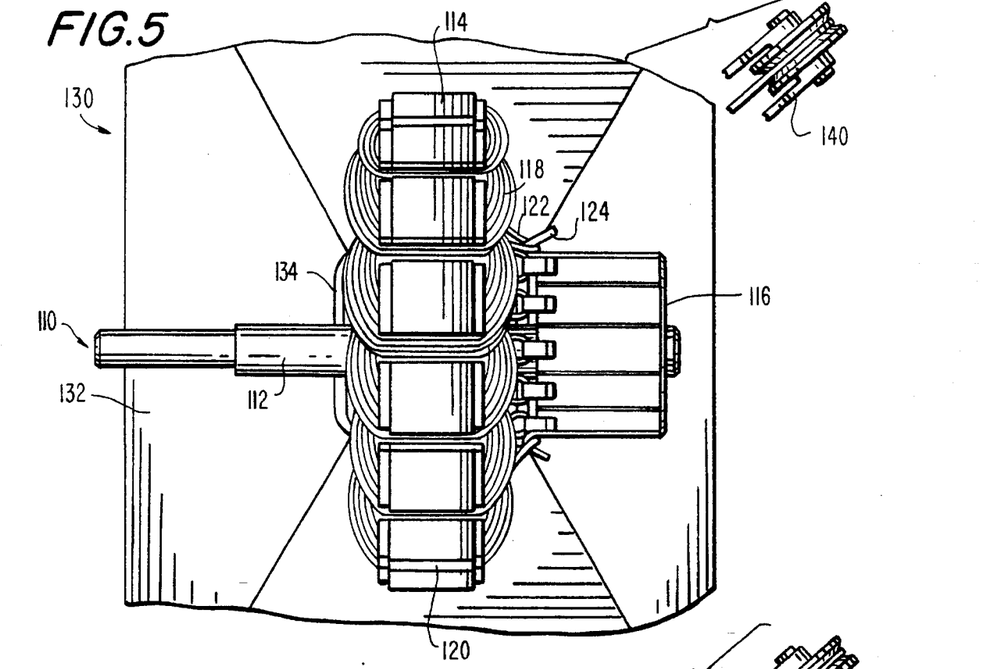
FIG. 5 is a view similar to FIG. 3, but illustrating the winding methods and apparatus of this invention.

In accordance with the present invention armatures can be wound with the commutator already very close to the core as shown in FIG. 5, thereby avoiding the need to shift the commutator after the coils have been wound. As shown in FIGS. 5–8, the wire guide 130 used in accordance with this invention is basically similar to the above-described wire guide 30, except that wire guide 130 supports a hooking plate 160 that is inclined so that it can reach into (or axially very close to) the area surrounded by the axial ends of coils 118 in order to approach tangs 124 that are very close to core 114. (In FIGS. 5–8 and subsequent FIGS. elements that are similar to elements in FIGS. 1–4 have reference numbers that are increased by 100 from the reference numbers used in FIGS. 1–4. Indeed, it should be noted that, except for the differences discussed below, the apparatus used in accordance with this invention can be generally similar to the apparatus described above in connection with FIGS. 1–4. For example, as in FIGS. 1–4, the coil winding and wire guiding apparatus of this invention is typically duplicated on each side of the armature so that coils on both sides of the armature can be wound simultaneously.)

Figure 6:
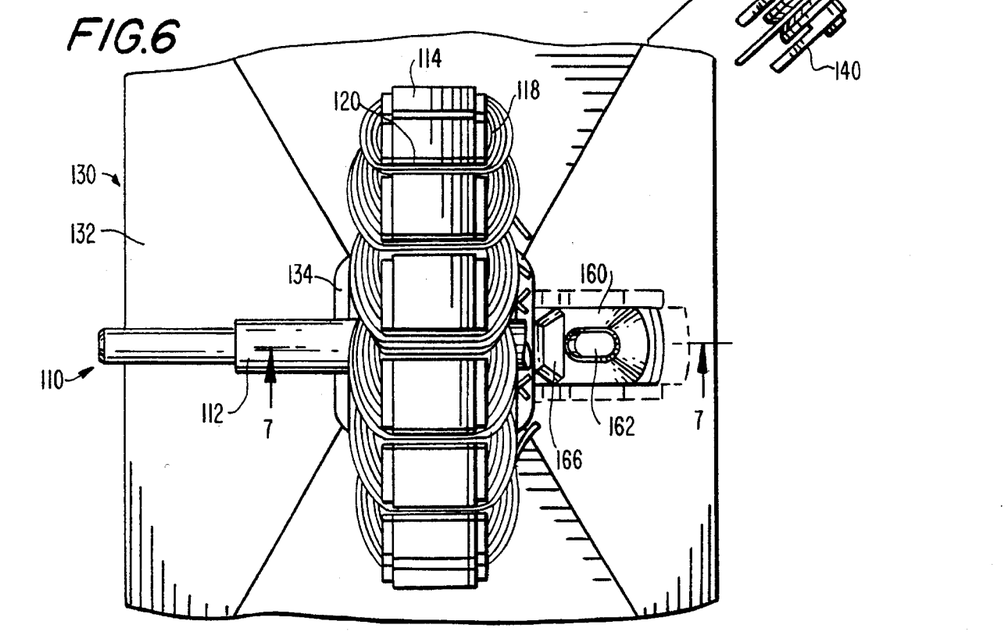
FIG. 6 is a view similar to FIG. 5, but with a portion of the armature removed to reveal additional components of illustrative winding apparatus in accordance with this invention.
Figure 7:
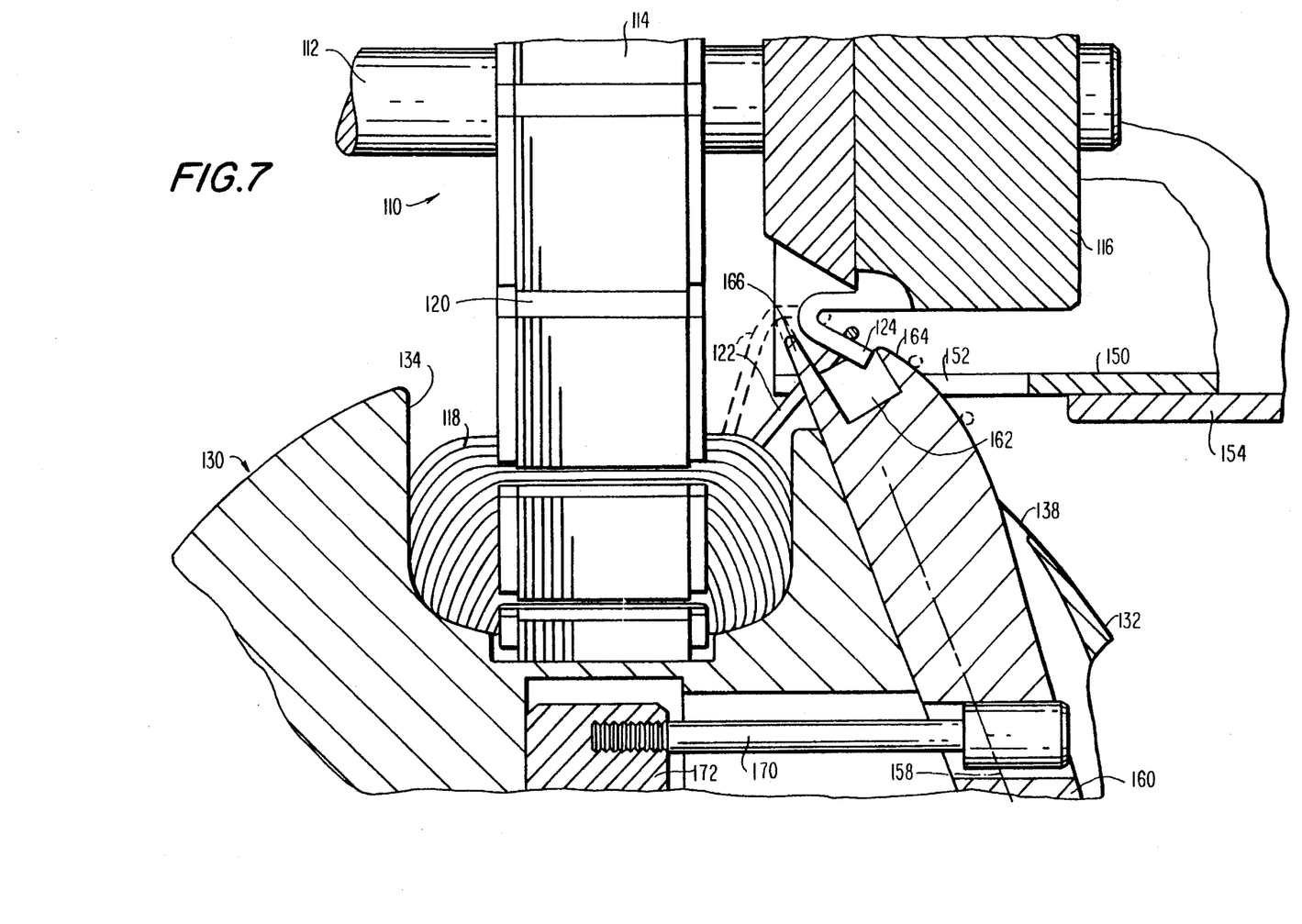
FIG. 7 is a simplified sectional view taken generally along the line 7—7 in FIG. 6.

As is evident from FIG. 7, hooking plate 160 reciprocates along an axis 158 that is inclined to both armature shaft 112 and a plane perpendicular to armature shaft 112. When extended from the associated wire guide 130, as shown in FIGS. 6 and 7, the operative end of hooking plate 160 emerges from an aperture 138 in the wire guide. (FIG. 6 is similar to FIG. 5 but with commutator 116 removed to reveal the operative end of hooking plate 160 projecting from aperture 138 in wire guide 130.) The operative end of hooking plate 160 has a recess 162 for receiving a tang 124. (Alternatively, hooking plate 160 can be a relatively thin member without a recess 162 and which abuts or slightly overlaps a tang.) A curved surface 164 of hooking plate 160 guides wire from flyer 140 beneath tang 124. As in the prior art this takes place after a coil 118 has been wound on core 114, after armature 110 has been rotated so that the desired tang is adjacent to slot 152 in inner sleeve 150, after outer sleeve 154 has been retracted to expose slot 152, and after hooking plate 160 has been moved to extend from aperture 138 in wire guide 130. As shown in FIG. 7, hooking plate 160 is moved by pin 170 which is connected to hooking plate actuator member 172. Member 172 is shiftable radially of armature 110.

After wire 122 has been deposited beneath tang 124 as described above, hooking plate 160 is withdrawn back into wire guide 130. Outer sleeve 154 is then extended again to cover slot 152. This prevents wire lead 122 from slipping off the tang, and also helps to urge the lead toward the base of the tang. Further movement of flyer 140 completes the desired alpha-shaped loop of lead 122 around tang 124. (This is described in more detail below in connection with FIGS. 10–18.) Then to help make sure that lead 122 is fully seated beneath tang 124, and also to press the wire of lead 122 radially inward and axially toward core 114 as shown in the dotted line position in FIG. 7, slot 152 is again exposed by retraction of outer sleeve 154 and hooking plate 160 is again extended toward tang 124. During this extension of hooking plate 160, a ledge 166 which projects from the operative end of hooking plate 160 contacts lead wire 122 and presses that wire radially inwardly toward shaft 112 and axially toward core 114. Indeed, in order to do this, hooking plate 160 may be extended farther at this time than during initial placement of lead 122 beneath tang 124. Thus in FIG. 7 the full line position of hooking plate 160 is the position used to initially guide wire 122 beneath tang 124, while the dotted line position of ledge 166 shows the subsequent farther extension of hooking plate 160 used to press wire 122 into its fully seated position and also to press wire 122 radially inward toward shaft 112 and axially toward core 114. This displacement of wire 122 is helpful to ensure that the wire adjacent to tang 124 does not hinder the subsequent radially inward motion of the fusing electrode used to deform tang 124 down into intimate contact with wire 122 and the remainder of commutator 116.

Figure 9:
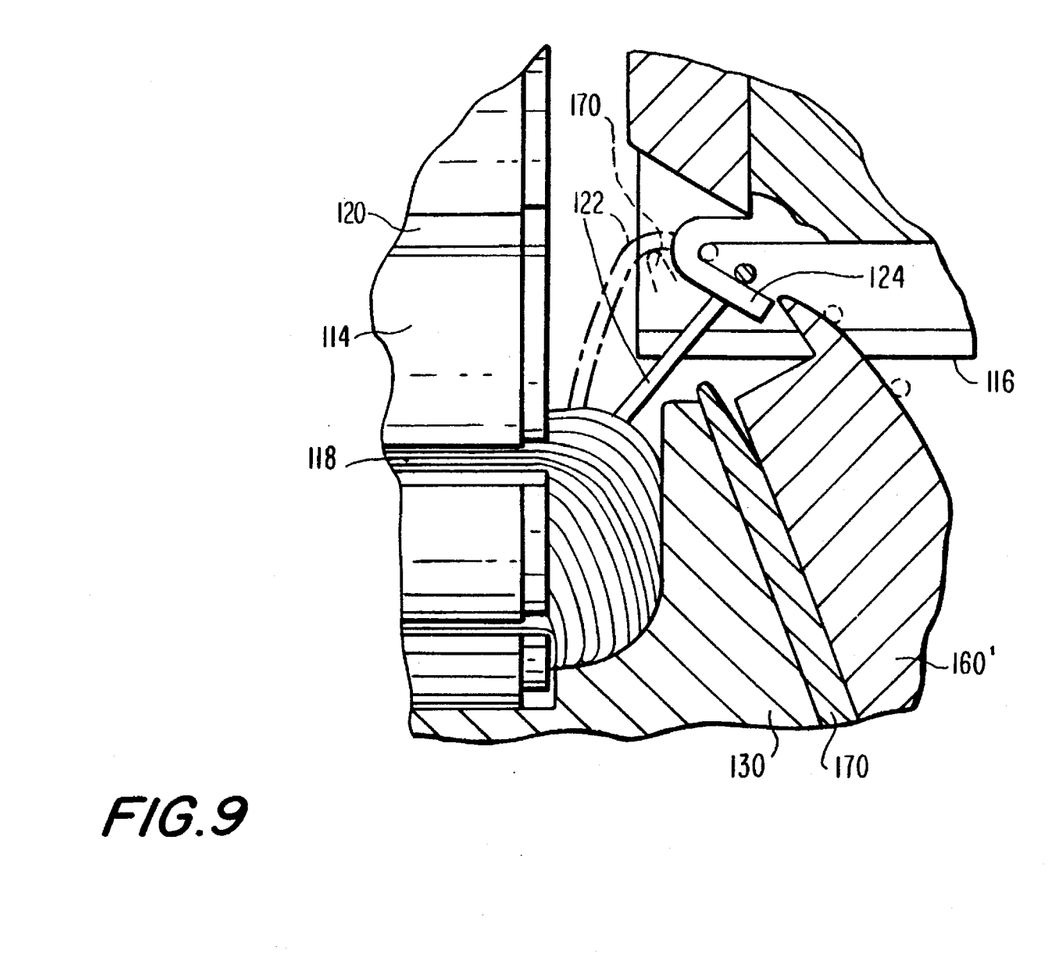
FIG. 9 is similar to a portion of FIG. 7 showing an alternative embodiment of the invention.

FIG. 9 shows an alternative embodiment in which an auxiliary member 170 is associated with hooking plate 160' for performing the function of ledge 166 in the previously described embodiment. Auxiliary member 170 is separately extendable farther than hooking plate 160' (i.e., to the position shown in dotted lines). This may make it possible to more effectively press wire 122 radially inward toward shaft 112 and axially toward core 114 than could be done using a ledge 166 affixed to the end of the hooking plate. Extension of the hooking plate may be limited by contact with commutator 116, but the extension of separate auxiliary member 170 is not so limited.

Figure 8:
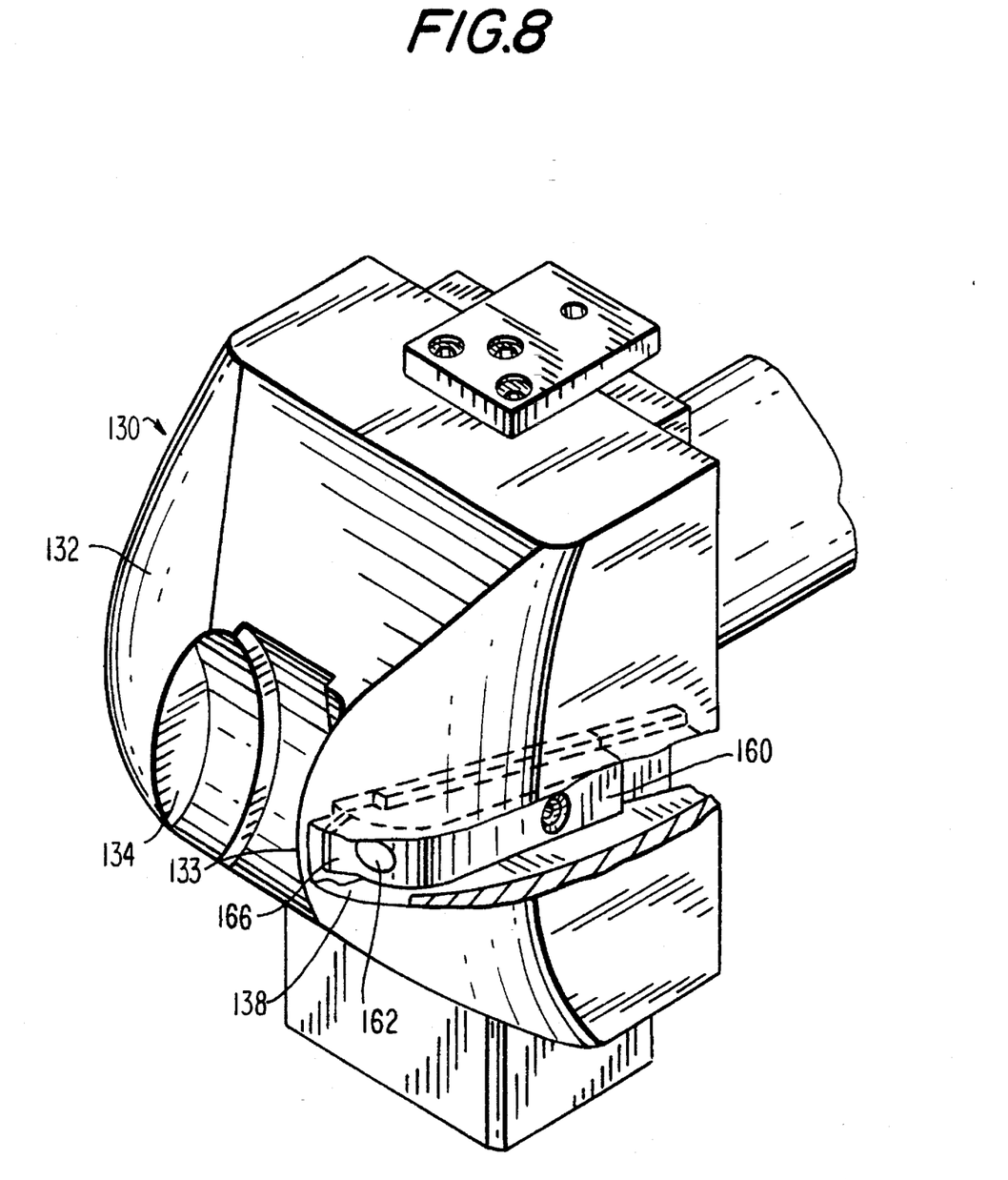
FIG. 8 is a simplified, partly sectional, perspective view of a portion of the apparatus shown in FIGS. 5–7.

FIG. 8 illustrates a principle that should be noted as follows. Although aperture 138 penetrates the convex surface 132 of wire guide 130, it is not desirable for aperture 138 to break the convex edge 133 of surface 132 adjacent to concave region 134. Wire from flyer 140 will snag on any discontinuity in edge 133. It should also be noted that FIG. 8 shows hooking plate 160 in its retracted position within wire guide 130.

FIGS. 10–18 illustrate a typical sequence of movements of flyer 140 and other components of apparatus of the types shown in FIGS. 5–9 to wind coils and form coil lead attachments to commutator tangs. In FIGS. 10–18 the commutator tangs are shown spaced axially from the armature core by a slightly greater amount than in FIGS. 5–9 just for greater clarity. Also for clarity, wire guides 130 are completely omitted from FIGS. 10–18, and the flyer 140 shown in these FIGS. is for winding coils on the side of the armature that is visible. Although this is an extremely minor point for those skilled in the art, the apparatus shown in FIGS. 10–18 winds coils by rotating flyer 140 in the opposite direction from the flyer that would be opposite the flyer shown in any of FIGS. 3–6. This slight difference between FIGS. 10–18, on the one hand, and the other FIGS., on the other hand, will be ignored in the following discussion.

Figure 10:
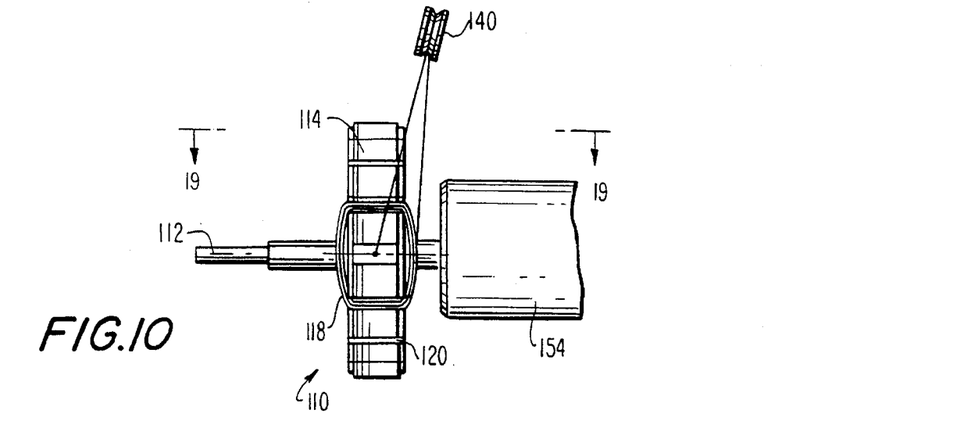
FIG. 10 is a simplified elevational view of apparatus of the type shown in FIGS. 5–9 at a particular point in the operating sequence of that apparatus in accordance with this invention.
Figure 11:
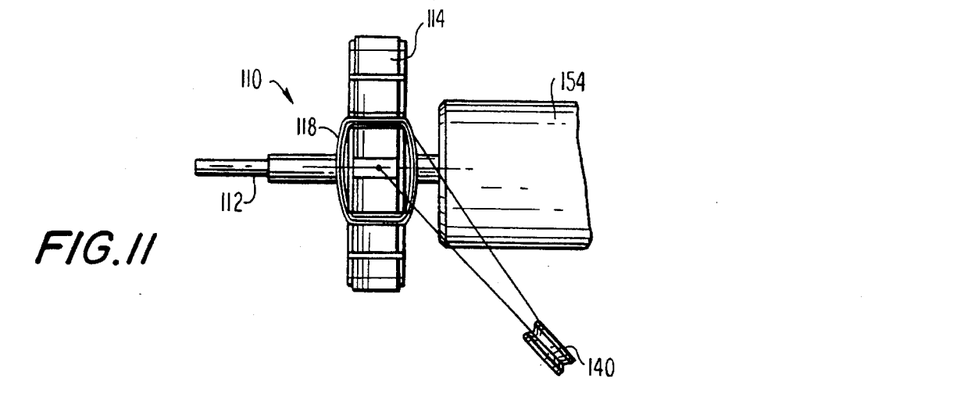
FIG. 11 is similar to FIG. 10, but shows a somewhat later stage in the operating sequence.
Figure 12:
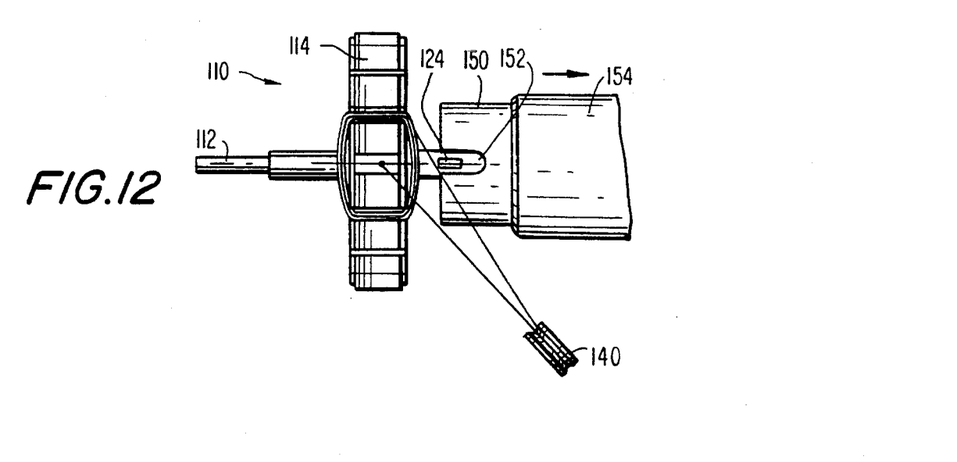
FIG. 12 is similar to FIG. 11, but shows a still later stage in the operating sequence.
Figure 13:
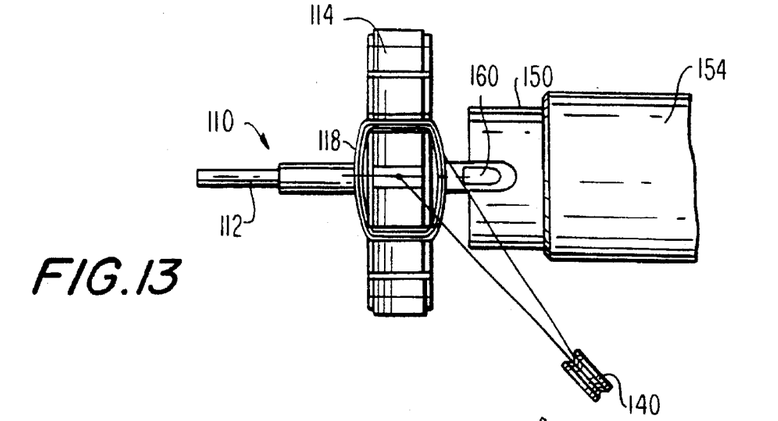
FIG. 13 is similar to FIG. 12, but shows an even later stage in the operating sequence.
Figure 14:
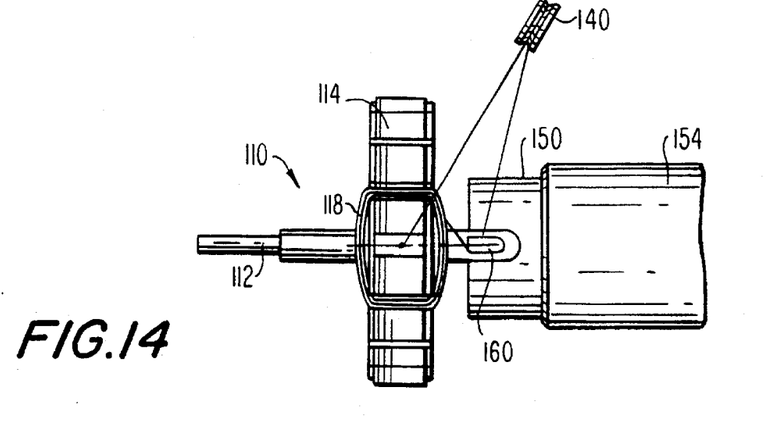
FIG. 14 is similar to FIG. 13, but shows a later stage in the operating sequence.

As shown by the sequence from FIG. 10 to FIG. 11, flyer 140 moves clockwise to wind coil 118 on core 114. When coil 118 has been fully wound, flyer 140 stops in the position shown in FIG. 11. The armature is then rotated about its shaft to properly position the tang 124 that is to receive the finish lead 122 from coil 118. Outer sleeve 154 is then retracted as shown in FIG. 12 to expose this tang 124 via the slot 152 in inner sleeve 150. Hooking plate 160 is then extended into the vicinity of tang 124 as shown in FIG. 13. Only the outline of the operative end of hooking plate 160 is indicated in FIG. 13 (and similar subsequent FIGS.). The actual position of the hooking plate in FIG. 13 is similar to the solid line position shown in FIG. 7 (or alternatively FIG. 9). Flyer 140 is then rotated counter-clockwise to the position shown in FIG. 14. This causes the wire from flyer 140 to be deposited beneath tang 124 in the manner shown by the full line wire position in FIG. 7 (or alternatively FIG. 9).

Figure 15:
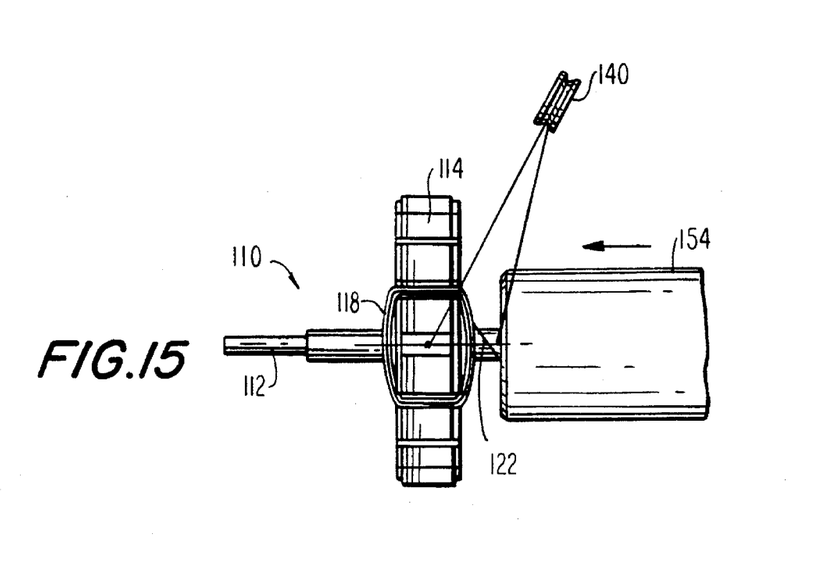
FIG. 15 is similar to FIG. 14, but shows a still later stage in the operating sequence.
Figure 16:
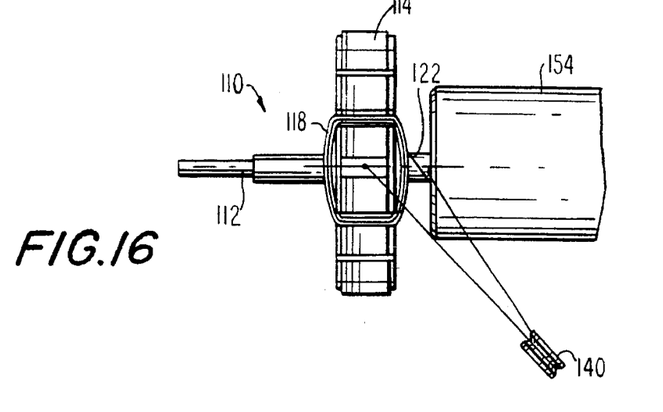
FIG. 16 is similar to FIG. 15, but shows an even later stage in the operating sequence.

The next operations are to retract hooking plate 160 and to re-extend outer sleeve 154 as shown in FIG. 15. This ensures that lead 122 cannot come off tang 124. Flyer 140 is then rotated clockwise to the position shown in FIG. 16. Outer sleeve 154 is then retracted again and hooking plate 160 is extended, this time to a position like the dotted line position shown in FIG. 7. (Alternatively, auxiliary member 170 is extended to a position like the dotted line position shown in FIG. 9.) Flyer 140 is also rotated somewhat farther in the clockwise direction. These operations ensure that lead 122 is fully seated at the base of the tang, and also that the lead is pushed radially inward toward shaft 112 and axially toward core 114 so that it does not interfere with subsequent tang-fusing operations.

Figure 18:
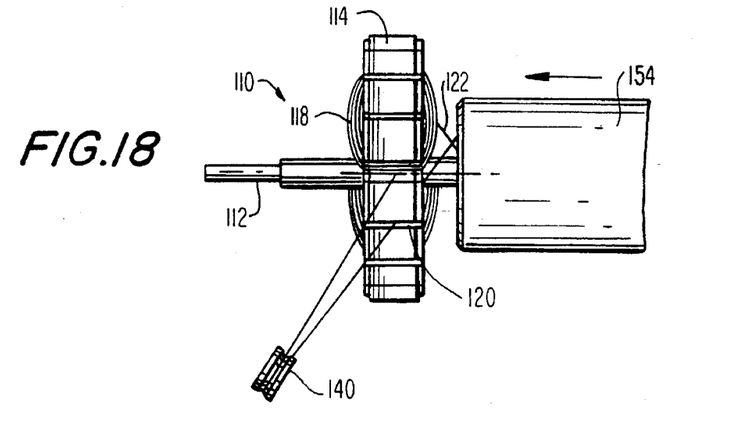
FIG. 18 is similar to FIG. 17, but shows a still later stage in the operating sequence.

The next operations are to again retract hooking plate 160 and extend sleeve 154 as shown in FIG. 18. Also as shown in that FIG., armature 110 is rotated about its shaft 112 to position the next pair of slots 120 to receive a coil of wire, and flyer 140 resumes its clockwise rotation to begin to wind that next coil.

Figure 19:
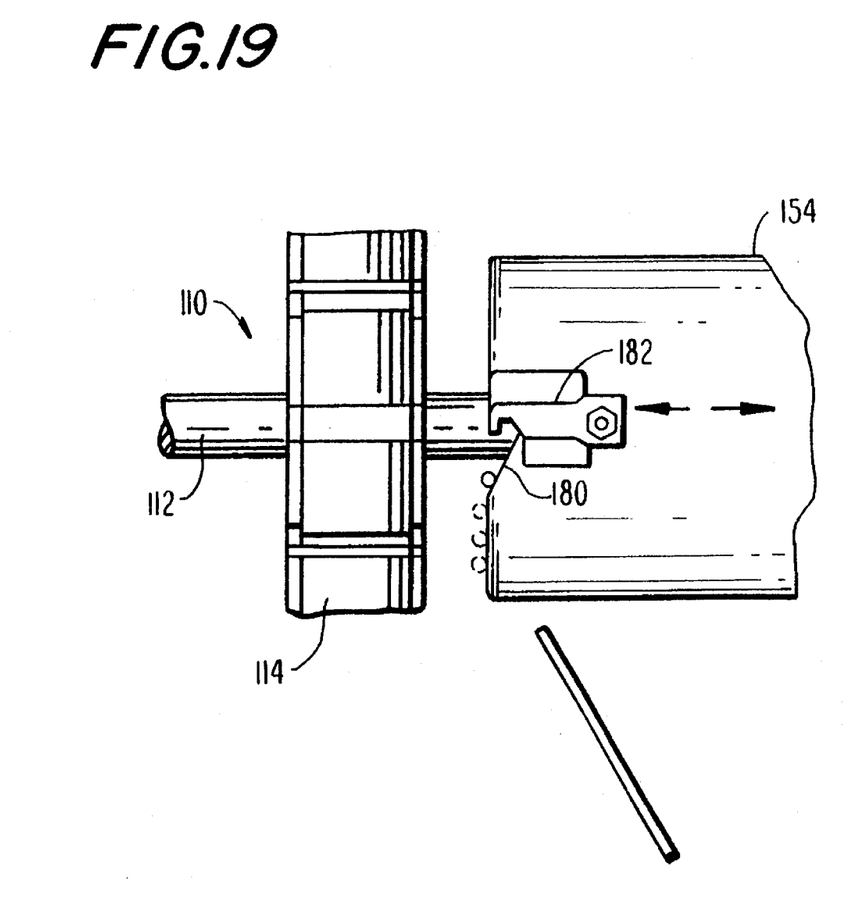
FIG. 19 is a view taken generally as indicated by the line 19—19 in FIG. 10 showing an illustrative embodiment of a portion of the apparatus of this invention.

FIG. 19 shows illustrative apparatus constructed in accordance with this invention for cutting wire, for example, at the beginning or ending of the winding of an armature. As indicated by the line 19—19 in FIG. 10, FIG. 19 is a view taken at 90° from views like FIG. 10. FIG. 19 shows that in the top of outer sleeve 154 there is a wire-receiving recess 180 near core 114. When winding of an armature has been completed, a conventional wire gripper (not shown) is operated to grip the wire between flyer 140 and the armature. The armature is then rotated about its shaft to cause the wire extending from the armature to the wire gripper to enter recess 180. When the wire is fully seated in recess 180, cutting member 182 is reciprocated as indicated by the arrows in FIG. 19 to cut the wire. In order to permit sleeve 154 to be quite close to core 114, the above-described wire cutting takes place in a recess 180 in the axial end of sleeve 154 rather than on structures that project axially from the end of sleeve 154 as is typical in the prior art.

Elements 180 and 182 may also be used at the start of winding an armature as follows. Winding begins with the wire extending from flyer 140 gripped by the above-described wire gripper (not shown). The flyer, sleeve 154, and armature are operated to cause the wire extending between the wire gripper and the flyer to be looped around a starting commutator tang 124. Thereafter, the armature is rotated to cause the wire extending from the armature to the wire gripper to enter recess 180. Cutter 182 is then operated as described above to cut the wire between the wire gripper and the armature. The wire gripper carries away for disposal the cut end of wire thus produced. Winding of the armature proceeds as described above.

Although only one wire cutting apparatus 180/182 is shown in FIG. 19, it will be understood that a second such apparatus may be provided in the diametrically opposite side of sleeve 154 for similarly operating on the wire from a second flyer 140.

Figure 20:
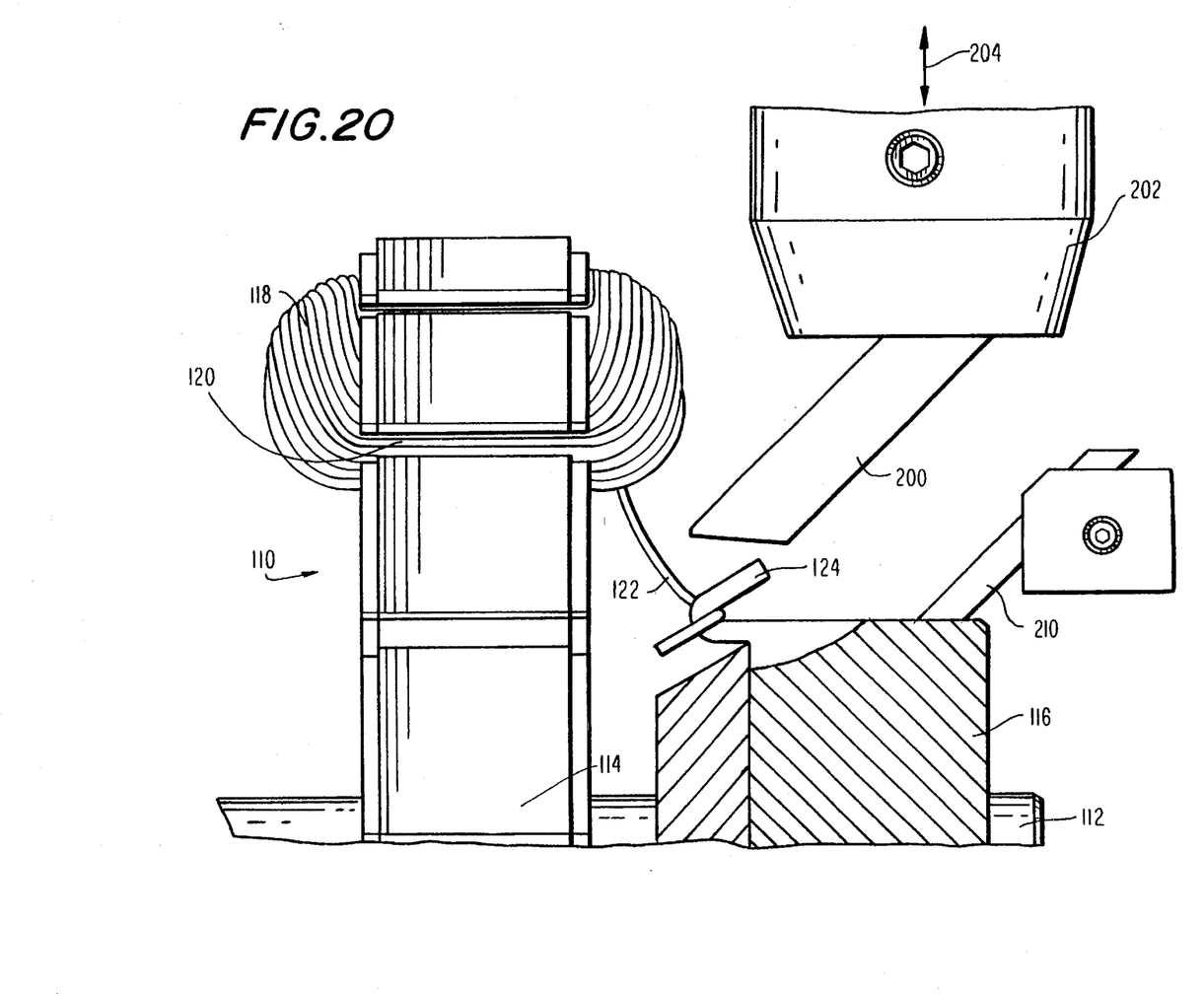
FIG. 20 is a simplified elevational view, partly in section, of illustrative fusing apparatus constructed in accordance with this invention.

FIG. 20 shows illustrative apparatus constructed in accordance with this invention for facilitating the fusing of tangs 124 that are relatively close to the core 114 of armature 110. As FIG. 20 shows, it would be difficult or impossible to press radially inwardly on tang 124 using a fusing electrode that extended radially out from the tang. Any such radial fusing electrode would be unacceptably close to the axial end portion of coil 118. Thus, in accordance with this invention, fusing electrode 200 is inclined from its holder 202 so that it can reach in toward tang 124. In this way holder 202 can be axially spaced from the adjacent axial end of coil 118, but the operative end of fusing electrode 200 can be positioned radially adjacent to tang 124. Holder 202 and fusing electrode 200 move radially inward toward shaft 112 (as indicated by arrow 204 in FIG. 20) in order to apply the pressure and heat needed to deform tang 124 radially inward into intimate mechanical and electrical contact with wire lead 122 and the remainder of commutator 116. Ground electrode 210 contacts commutator 116 at a location spaced from tang 124. As is usual for fusing operations, electrical current is passed through fusing electrode 200, commutator 116, and ground electrode 210 in order to heat the fusing electrode and thereby heat tang 124 and lead 122. This heat vaporizes the insulation on lead 122 and helps ensure a good mechanical and electrical bond between elements 116, 122, and 124.

To get fusing electrode 200 to the position relative to tang 124 shown in FIG. 20 (as is appropriate for the commencement of fusing operations), it may be necessary to employ a sequence of relative motions between armature 110 and fusing electrode 200 that includes moving electrode 200 radially toward commutator 116 while electrode 200 is axially spaced from core 114 and its coils 118, and then moving electrode 200 axially toward core 114. In actual practice, it may be preferable to produce these relative motions by holding electrode 200 stationary while moving armature 110.

It will also be observed from FIG. 20 how the radial inward deformation of lead 122 produced by the second extension of hooking plate 160 (or by the extension of auxiliary member 170) helps ensure that the lead does not unduly interfere with the radially inward motion of fusing electrode 200 during fusing operations.

Figure 17:
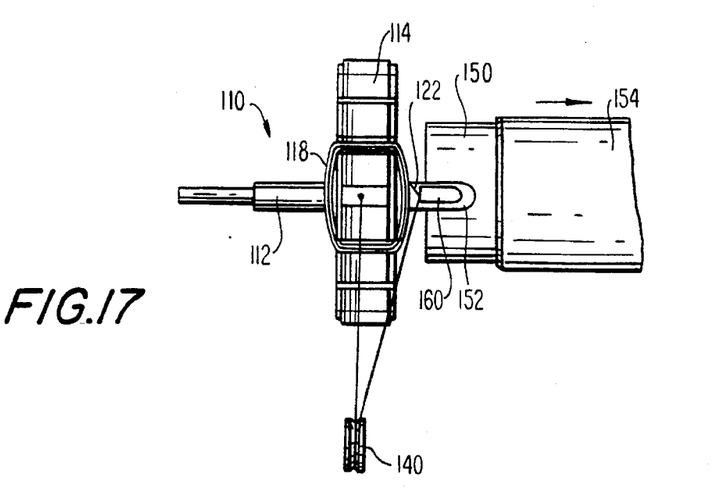
FIG. 17 is similar to FIG. 16, but shows a later stage in the operating sequence.
Figure 21:
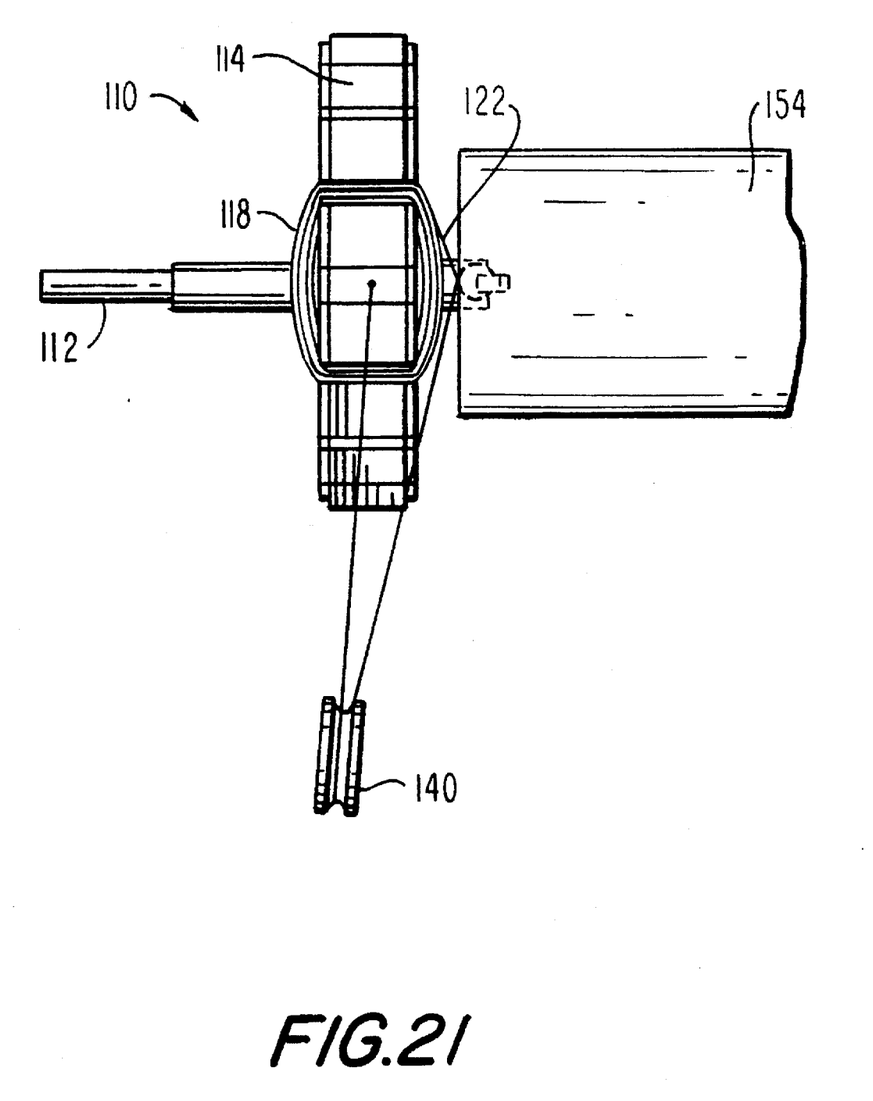
FIG. 21 is a view similar to FIG. 17 showing an alternative way of accomplishing the operation shown in FIG. 17 in accordance with an alternative embodiment of this invention.

Returning to the coil winding operations illustrated by FIGS. 10–18, an alternative way to push coil leads 122 radially in toward shaft 112 and axially toward core 114 as shown in FIG. 17 is to use outer sleeve 154 to perform these functions. As shown in FIG. 21, this involves axially extending outer sleeve 154 more toward core 114 than it otherwise would be extended. This can be done in place of the operations depicted in FIG. 17. Thus in this alternative, FIG. 21 would replace FIG. 17 in the sequence from FIG. 10 to FIG. 18, and there is no need for pusher structure 166 or 170 on or associated with the hooking plate. Extending outer sleeve 154 more toward core 114 as shown in FIG. 21 fully seats lead 122 in the associated tang and also pushes the wire radially inward toward shaft 112 by causing the lead to slide down the incline of the tang. This additional axial extension of outer sleeve 154 toward core 114 also pushes lead 122 axially toward core 114. As has been described, these deflections of lead 122 help ensure that the lead will not interfere with subsequent tang fusing operations.

As an alternative to axially extending outer sleeve 154 after each coil lead 122 has been formed on each side of the armature, outer sleeve 154 can be extended as shown in FIG. 21 after several or even all coil leads have been formed. As still another alternative, a ring member similar to outer sleeve 154 can be used as shown in FIG. 21 at any convenient time after the armature has been formed. For example, such an operation can be performed after the armature has left the winding station but before the commutator tangs are fused.

It will be understood that the foregoing is only illustrative of the principles of this invention, and that various modifications can be made by those skilled in the art without departing from the scope and spirit of the invention. For example, the axial spacing between core 114 and commutator 116 may differ from that shown in the drawings.

The invention claimed is:

1. Apparatus for winding coils of wire on a dynamoelectric machine armature having a shaft, a core mounted concentrically on said shaft, and a commutator mounted concentrically on said shaft adjacent to said core, said core having a plurality of axially extending slots cut radially into its outer periphery, and said commutator having a plurality of coil lead anchoring structures adjacent to said core, said apparatus comprising:

a flyer having a wire dispensing outlet that is rotatable about a flyer axis that is substantially perpendicular to said shaft adjacent to said core;

a wire guide for guiding wire dispensed from said outlet to a pair of said slots; and a hooking plate that is reciprocable along a hooking plate axis that is inclined relative to both said shaft and a plane perpendicular to said shaft for guiding wire from said outlet to a coil lead anchoring structure when said hooking plate is reciprocated toward said armature.

2. The apparatus defined in claim 1 wherein said hooking plate is reciprocable through an aperture in said wire guide.

3. The apparatus defined in claim 1 further comprising a wire pusher member that is reciprocable along said hooking plate axis for pushing wire extending between said core and said coil lead anchoring structure radially inwardly toward said shaft when said pusher member is reciprocated toward said armature.

4. The apparatus defined in claim 3 wherein said pusher member is integral with said hooking plate, and wherein said pusher member is operative when said hooking plate is reciprocated farther toward said armature than when said hooking plate is guiding wire from said outlet to said coil lead anchoring structure.

5. The apparatus defined in claim 2 wherein said wire guide has a generally convex wire guiding surface with a concave recess for receiving a portion of the periphery of said core which is between said pair of slots, and wherein said aperture is disposed in said generally convex wire guiding surface at a location that is spaced from said concave recess.

6. Apparatus for winding coils of wire on a dynamoelectric machine armature having a shaft, a core mounted concentrically on said shaft, and a commutator mounted concentrically on said shaft adjacent to said core, said core having a plurality of axially extending slots cut radially into its outer periphery, and said commutator having a plurality of coil lead anchoring structures adjacent to said core, said apparatus comprising:

a flyer having a wire dispensing outlet that is rotatable about a flyer axis that is substantially perpendicular to said shaft adjacent to said core;

a wire guide surface for guiding wire dispensed from said outlet to a pair of said slots; and a wire guiding member extendable from said wire guide surface toward a coil lead anchoring structure along an axis that is inclined toward said shaft in a direction along said shaft from said commutator to said core for guiding wire from said outlet to said coil lead anchoring structure when said wire guiding member is extended toward said coil lead anchoring structure.

7. The apparatus defined in claim 6 further comprising:

a shield member for selectively covering said coil lead anchoring structures, said shield member having an edge that is adjacent to said core, said edge having a recess for selectively receiving wire extending from said armature to said outlet; and means for selectively cutting the wire in said recess.

8. The method of winding coils of wire on a dynamoelectric machine armature having a shaft, a core mounted concentrically on said shaft, and a commutator mounted concentrically on said shaft adjacent to said core, said core having a plurality of axially extending slots cut radially into its outer periphery, and said commutator having a plurality of coil lead anchoring structures adjacent to said core, said method comprising the steps of:

shielding said coil lead anchoring structures;

rotating a wire dispenser about a wire dispenser axis that is substantially perpendicular to said shaft adjacent to said core;

guiding wire from said rotating wire dispenser into a pair of said slots;

after a coil of wire has been deposited in said pair of slots, unshielding a coil lead anchoring structure;

extending a hooking plate toward said coil lead anchoring structure along a hooking plate axis that is inclined relative to said shaft and a plane perpendicular to said shaft so that said hooking plate guides wire from said rotating wire dispenser into said coil lead anchoring structure; and after wire has been deposited in said coil lead anchoring structure, retracting said hooking plate and re-shielding said coil lead anchoring structure.

9. The method defined in claim 8 further comprising the step of:

reversing the direction of rotation of said wire dispenser during operation of said hooking plate to guide wire into said coil lead anchoring structure.

10. The method defined in claim 8 wherein, after wire has been deposited in said coil lead anchoring structure, said method comprises the further step of:

deflecting the wire extending between said core and said coil lead anchoring structure radially inwardly toward said shaft.

11. The method defined in claim 10 wherein said deflecting step comprises the step of:

extending a wire pusher member substantially parallel to said hooking plate axis.

12. The method defined in claim 11 wherein said wire pusher member is integral with said hooking plate, and wherein said wire pusher member is operative when said hooking plate is extended along said hooking plate axis farther than during operation of said hooking plate to guide wire into said coil lead anchoring structure.

13. The method defined in claim 10 further comprising the step of:

unshielding said wire anchoring structure during performance of said deflecting step.

14. The method defined in claim 9 further comprising the step of:

again reversing the direction of rotation of said wire dispenser after wire has been deposited in said coil lead anchoring structure.

15. The method defined in claim 14 wherein, after a predetermined amount of rotation of said wire dispenser during said again reversing step, said method comprises the further steps of:

again unshielding said coil lead anchoring structure;

deflecting the wire extending between said core and said coil lead anchoring structure radially inwardly toward said shaft; and again re-shielding said coil lead anchoring structure.

16. The method defined in claim 15 wherein said deflecting step comprises the step of:

extending a wire pusher member substantially parallel to said hooking plate axis.

17. The method defined in claim 16 wherein said wire pusher member is integral with said hooking plate, and wherein said wire pusher member is operative when said hooking plate is extended along said hooking plate axis farther than during operation of said hooking plate to guide wire into said coil lead anchoring structure.

18. The method defined in claim 8 wherein said guiding step is performed by a wire guiding surface which is substantially convex except for a concave recess which receives a portion of the periphery of said core which is between said pair of slots, and wherein said extending step comprises the step of:

extending said hooking plate from an aperture in said substantially convex wire guiding surface at a location that is spaced from said concave recess.

19. The method of winding coils of wire on the core of an armature for a dynamo-electric machine and attaching leads from said coils to coil lead anchoring structures on a commutator of said armature, said core and said commutator being mounted axially adjacent to one another on a central shaft of said armature, a wire guide surface being used to guide wire from a wire source to said core, said method comprising the steps of:

extending a wire guiding member toward a lead anchoring structure to deflect wire from said wire guide surface into said lead anchoring structure; and extending a pusher member into the region between said lead anchoring structure and said core to deflect wire extending between said core and said lead anchoring structure radially inwardly toward said shaft and axially toward said core.

20. The method defined in claim 19 wherein said wire guiding member and said pusher member are integral with one another, and wherein said step of extending a pusher member includes extending said wire guiding member farther toward said lead anchoring structure than during said step of extending a wire guiding member.

21. The method defined in claim 19 wherein said pusher member also functions in a first position as a shield for preventing wire from entering said lead anchoring structure, said pusher member being movable to a second position to allow wire to enter said lead anchoring structure, and wherein said step of extending said pusher member includes the step of moving said pusher member to a third position.

22. Apparatus for winding coils of wire on a dynamo-electric machine armature having a shaft, a core mounted concentrically on said shaft, and a commutator mounted concentrically on said shaft adjacent to said core, said core having a plurality of axially extending slots cut radially into its outer periphery, and said commutator having a plurality of coil lead anchoring structures adjacent to said core, said apparatus comprising:

a flyer having a wire dispensing outlet that is rotatable about a flyer axis that is substantially perpendicular to said shaft adjacent to said core;

a wire guide for guiding wire dispensed from said outlet to a pair of said slots, said wire guide having a generally convex wire guiding surface with a concave recess for receiving a portion of the periphery of said core which is between said pair of slots; and a hooking member selectively extendable toward a coil lead anchoring structure through an aperture in said generally convex wire guiding surface at a location that is spaced from said concave recess to guide wire from said outlet to said coil lead anchoring structure when said hooking member is extended toward said coil lead anchoring structure.

23. The apparatus defined in claim 22 further comprising:

a wire pusher member selectively extendable toward said coil lead anchoring structure through said aperture for pushing wire extending between said core and said coil lead anchoring structure radially inwardly toward said shaft when said pusher member is extended toward said coil lead anchoring structure.

24. The apparatus defined in claim 23 wherein said pusher member is integral with said hooking member, and wherein said pusher member is operative when said hooking member is extended farther toward said coil lead anchoring structure than when said hooking member is guiding wire from said outlet to said coil lead anchoring structure.

* * * * *